United States Patent Office 3,557,402
Patented Jan. 26, 1971

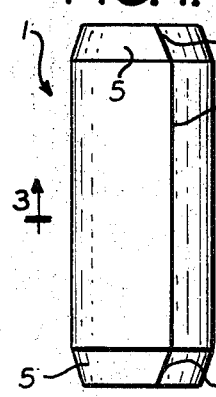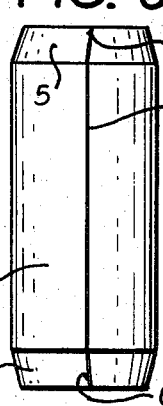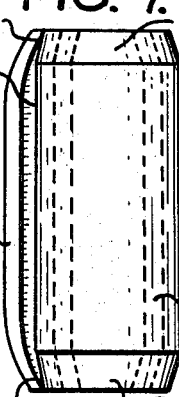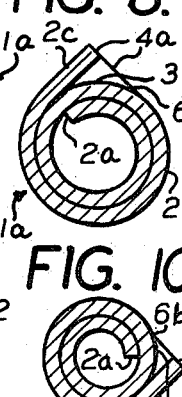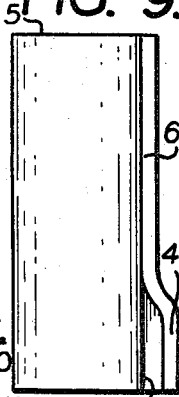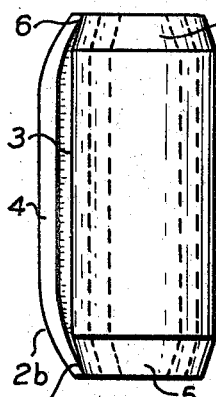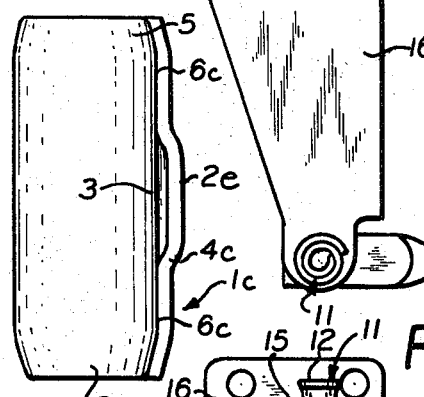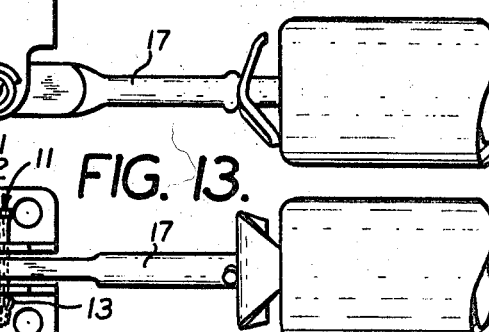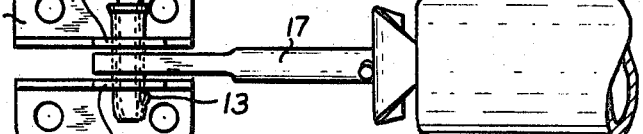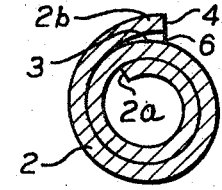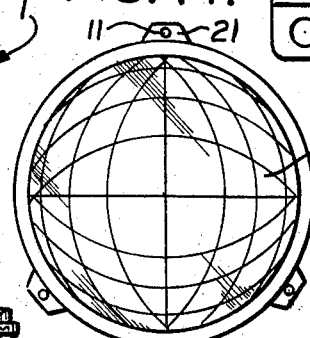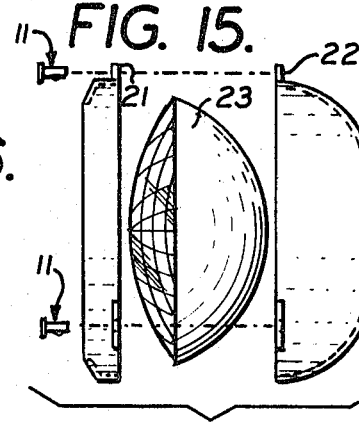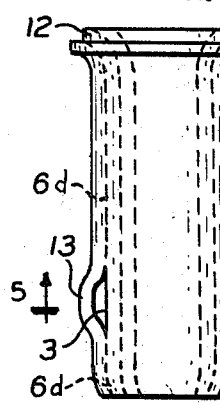

3,557,402
COILED FASTENING PIN
Hans H. Koehl, Brooklyn, Conn., assignor to C.E.M.
Company, Inc., Danielson, Conn., a corporation of
Connecticut
Filed Dec. 4, 1968, Ser. No. 780,965
Int. Cl. E05d 5/10; F16b 19/02
U.S. Cl. 16—168                              15 Claims

ABSTRACT OF THE DISCLOSURE

A fastening pin, comprising a spirally wound sheet material having an outer end portion on the outer surface thereof terminating in an edge extending along its length, the end portion including the edge at least in part spaced from the sheet material wound thereunder constituting a spring lip, and the spirally wound sheet material having a diametric thickness through the end portion greater than the diametric thickness through the rest of the spirally wound sheet material.

---

The present invention relates to fastening pins, in general, and to coiled fastening pins, in particular.

Conventional resilient fastening pins produced from sheet metal have several disadvantages. Two types of conventional fastening pins are known: one, the slotted tubular type, is a hollow cylindrical pin with an axial slot; and the other, the spirally coiled fastening pin, is a pin composed of several turns of spirally wound sheet material. Both of these pins have a free diameter larger than the recommended hole for which they are designed. Each has at least one end tapered to facilitate insertion of the pin into the hole. Consequently, when the pin is inserted, the diameter of the pin is reduced to the diameter of the hole, producing radial compression on the pin which retains the pin in the hole.

With these conventional pins, the insertion into a hole drastically reduces the flexibility of the pin. With the slotted, tubular type pin, the slot closes at a ratio of 1 to $\pi$. That is, for each .001 inch reduction in diameter, the slot closes by approximately .00314 inch. Furthermore, in order to prevent nesting in the free state, it is necessary to keep the slot width less than the wall thickness. This combination of factors means that for all practical purposes the slot is closed after insertion. With the spirally coiled type pin, the reduction in diameter resulting from the insertion of the pin increases the radial friction between the coils or windings to the point where further relative movement becomes practically impossible. Flexibility is accordingly reduced. Since the chamfer locks the pin at its ends, the flexibility is further reduced. With neither pin is there any designed flexibility after insertion.

Another major disadvantage of the known spring pins is that they cannot be readily inserted unless there is a solid backing to the insertion force or blow. The insertion itself requires a substantial amount of force, even with one of the ends tapered. For example, the driving of such a pin into a shaft, unless the shaft is properly supported, is impossible. Proper backing in many instances, particularly in the final assembly of equipment, is impossible. The insertion of the known pins imparts undesirable stresses on the pins which reduce the additional load which the pins are capable of absorbing before reaching the elastic limit.

The shear strength and flexibility after insertion are related to each other, and any reduction in flexibility increases the shear strength; and an increase in flexibility decreases the shear strength. Since flexibility after insertion is affected by the size of the hole, the size of the hole also affects the shear strength.

The maximum shear strength potential is not obtainable with the conventional pins.

For equal shear stress distribution, the pin should be solid and have no more flexibility. Since the design of a slotted pin which would have its slot completely closed after insertion, or a coiled pin which is completely locked after insertion due to frictional forces, would require the elimination of hole tolerances as well as the tolerances of the strip from which the pin is produced, this is practically an unobtainable situation.

Further, the insertion pressure of the pin increases as the strength of the pin is increased. For example, a slotted tubular pin made from thicker material requires a greater insertion pressure. With a spirally coiled pin, both an increase in material thickness as well as the tightness of the roll, both of which increase the shear strength, require a greater insertion pressure. Accordingly, the insertion pressure limits the strength of the pin, since the insertion pressure has to be kept not only within reasonable bounds, but also below the columnar strength of the pin.

Additionally, since the diameter along substantially the entire length of conventional spring pins is larger than the hole, it is impossible to make the pins capable of free standing in the hole prior to insertion. The taper is too short to accomplish free standing. This also prevents the manual insertion of a spring pin partially into a hole to line up the hole in a second part, making the insertion of spring pins difficult. If the pins are short, it is impossible to hold them by hand for hammer insertion. If the pins are to be inserted with a press, special fixtures are required to hold the pin upright which slows down the assembling process in many instances.

Furthermore, the radial tension of presently known pins cannot be limited to any part of their length, but must cover the entire length of the pin, hinge applications are troublesome. The radial tension of the pin tends to enlarge the pin to fit the diameters of the various holes that make up a hinge. As a result, the holes of the hinge cannot be of the same diameter, and thus drilled together for better alignment. The tolerance range of the various holes has to be restricted with the free hinge holes substantially larger than the tight fitting holes.

It is one object of the present invention to provide resilient coiled fastening pins which do not have the above-mentioned disadvantages.

It is another object of the present invention to provide resilient coiled fastening pins which continue to be flexible after insertion in a hole, and which pins are able to absorb shock and vibrations without damage to the pins or to the hole walls.

It is yet another object of the present invention to provide resilient coiled fastening pins which can be easily inserted without requiring a solid backing to the insertion force, yet retaining strength and shock absorbing qualities.

It is still yet another object of the present invention to provide a resilient coiled fastening pin which is capable of low force insertion and low force removal.

It is still another object of the present invention to provide a coiled fastening pin having a built-in flexibility for insertion and retention in the hole, as well as flexibility after insertion in the hole, each independent and unaffected by the other. Such a pin has all the advantages of the conventional pins for retaining itself in the hole and yet is readily removable and reusable, and does not have the above-mentioned disadvantages of the conventional pins.

It is yet still another object of the present invention to provide a fastening pin, comprising a convolutely wound sheet material having an outer end portion on the outer surface thereof terminating in an edge extending along its length, the end portion including the edge at least in part spaced from the sheet material wound thereunder constituting a spring lip, and the convolutely wound sheet material having a diameter thickness through the end portion greater than the diametric thickness through the rest of the convolutely wound sheet material.

With the above and other objects in view which will become apparent in the following detailed description, the present invention will be clearly understood in connection with the accompanying drawings, in which:

FIG. 1 is a front elevation of a resilient coiled spring lip fastener pin according to the present invention;

FIG. 2 is a side elevation of the fastener pin of FIG. 1;

FIG. 3 is a section along the lines 3—3 of FIG. 1;

FIG. 4. is a front elevation of a resilient coiled low force insertion fastening pin according to the present invention;

FIG. 5 is a section along the lines 5—5 of FIG. 4;

FIG. 6 is a front elevation of another embodiment of a spring lip fastener pin according to the present invention;

FIG. 7 is a side elevation of the fastener pin of FIG. 6;

FIG. 8 is a section along the lines 8—8 of FIG. 6;

FIG. 9 is a front elevation of another embodiment of a spring lip fastener pin;

FIG. 10 is a section along the lines 10—10 of FIG. 9;

FIG. 11 is a front elevation of still another embodiment of a spring lip fastener pin;

FIG. 12 is a top plan view of a storm door closing device using the low force insertion fastening pin of FIGS. 4–5;

FIG. 13 is a front elevation of FIG. 12;

FIG. 14 is a front elevation of a glass headlight flange structure;

FIG. 15 is an exploded side elevation of a headlight assembly using the bumped lip pin of FIGS. 4–5; and FIG. 16 is an enlarged fragmentary side elevation of the operatively connected headlight assembly.

Referring now to the drawings, and more particularly to FIGS. 1–3, a resilient coiled pin 1 having a spring lip, in accordance with the present invention, is illustrated. The pin 1 is produced from a spirally wound sheet of material 2 of substantially uniform thickness. The sheet material may be made of, for example, a metal, such as high carbon steel, spring brass, and other resilient copper alloys, or other materials having a substantial degree of spring action as well as sufficient rigidity to substantially retain its shape.

The coiled pin 1 is formed preferably of slightly more than two complete windings, although the number of windings of the sheet 2 as well as its axial length is selected depending upon the selected sheet material, the thickness and other characteristics thereof, as well as the size of the hole in which it is to be inserted, and other characteristics of usage. The number of coils and the tightness of the roll and the particular design depend on the flexibility or strength desired.

As illustrated in FIG. 3, although not limited thereto, the coil windings are contiguous to each other, abutting in surface to surface contact the adjacent facing surfaces of the coiled sheet 2 at all points from the inner end 2a up to, but not including the outer portion 2b of the sheet 2.

The outer portion 2b of the pin 1 is formed as a spring lip in spaced relationship from the adjacent facing surface 3 of the winding immediately therebelow. As illustrated in FIG. 1; the extreme edge 4 of the outer portion 2b of the sheet 2 longitudinally extends substantially parallel to the axis of the pin.

The outer portion 2b is preferably curved, having a substantially larger radius of curvature than the rest of the spirally wound sheet 2. The ends 5 of the pin 1 are tapered, as shown in this embodiment, and the extreme ends of the outer portion 2b are bent inwardly at the tapered ends 5 abutting the surface 3 of the sheet directly thereunder, forming contiguous surface abutting portions 6.

The diameter of the pin 1 is largest through the outer edge 4 of the pin. The diameter through the other portions of the pin, other than the portion 2b, is formed with a free diameter substantially equal to the diameter of the recommended hole in which the pin is to be inserted.

The distance between the outer edge 4 of the sheet 2, on the one hand, at the portion 2b projecting away from the sheet surface 3 therebelow forming the spring lip, and the surface 3, on the other hand, is at least equal to the difference between the free diameter of the pin and the maximum size of the hole in which the pin is to be inserted.

The spring lip 2b is resilient and elastically contracts when inserting the pin in a hole, providing the required flexibility for retention of the pin in the hole. The coiled spiral windings of the pin 1 are not affected by this insertion since the flexing and retaining of the pin occurs primarily at the spring lip. Bending and compressing of the coils or windings of the pin, other than at the spring lip, do not occur. Since the windings are not affected during insertion of the pin in a hole, the pin offers the desired flexibility and/or strength when in the inserted position.

The spring lip is defined as that part of the outer portion 2b which is spaced from the surface 3 of the winding immediately thereunder, i.e., between the contiguous surface abutting portions 6.

Since a chamfer is no longer necessary with the pin of the present invention, the outer portion 2b can be partially folded to form the contiguous surface abutting portion 6 on either or both ends of the spring lip for any desired length of the pin. The embodiment illustrated in FIG. 2 shows the contiguous surface abutting portions 6 only at the extreme tapered ends 5 of the pin 1, and the embodiment of FIG. 11 discloses extended contiguous surface abutting portions 6c at both ends of the spring lip. FIG. 9 shows an extended contiguous surface abutting portion 6b of outer portion 2d extending from one end to a point adjacent the spring lip located at the other end.

Accordingly, the flexibility upon insertion provided by the spring lip spaced from the surface 3 of the winding thereunder need not cover the entire length of the pin, but may be restricted to any part thereof, as disclosed, for example, in the various embodiments of the present invention.

Although preferable, the tapered ends 5 of the pins 1 are not necessary to the present invention, although desirable for permitting locating of the hole. With the pin of the present invention, even a tapered end is not required for free standing since the free diameter of the pin is smaller than the hole size. The mere providing of the contiguous surface abutting portions 6, with or without tapered ends, is sufficient.

The flexing of the spring lip does not affect the flexibility of the windings of the pin since the windings are effectively isolated from the spring lip spaced therefrom.

Referring now again to the drawings, and more particularly to FIGS. 6, 7 and 8, a coiled pin 1a is illustrated, similar to that of FIGS. 1–3. The spring lip is formed at outer spaced portion 2c spaced from the surface 3 of the winding therebelow, and is flat, not curved (FIG. 8). A wider diameter through the spring lip is provided. The other features of the coiled pin of this embodiment are the same as those of FIGS. 1–3, as indicated by the reference characters.

Referring now to the drawings, and more particularly to FIGS. 9 and 10, another embodiment of a resilient coiled fastener pin 1b is disclosed wherein the spring lip of outer portion 2d is formed adjacent one end of the pin and terminates in an edge 4b. The spring lip is spaced from the surface 3 of the winding coiled directly thereunder. The remainder of the end portion 2d of the sheet material 2 is pressed against the adjacent surface 3 of the inner layer, forming a contiguous abutment surface 6b extending from one end 5 of the pin 1b to the spring lip. With this embodiment, there is provided a resilient coiled pin with spring lip on one end only which facilitates lining up by hand of holes utilizing the pin.

In the embodiment illustrated in FIG. 11 a resilient pin 1c comprises a spring lip at the outer portion 2e of the winding which is restricted to the central portion of the pin in order to permit lining up of the holes, free standing of the pin for easy insertion, and free moving hinge applications. The remainder of the outer portion 2e forms an abutment surface 6c extending from each end of the pin to the spring lip contiguously against the surface 3 of the adjacent inner winding. Both of the ends 5 of the pin can be tapered as illustrated.

Referring now again to the drawings, and more particularly to FIGS. 4 and 5, a coiled pin 11 is illustrated having a free diameter substantially equal with the diameter of a recommended hole in which it is to be inserted. One end 12 of the pin 11 is formed as an outwardly flanged head. Holes may be provided instead through which a ring can be inserted (not shown). At a portion adjacent the other end of the pin 11, the outer portion 2f of the winding is spaced from the surface 3 of the inner winding therebelow forming a bump 13 of limited extent in the axial direction of the pin. The edge 4d of the outer portion 2f at the bump 13, is likewise spaced from the surface 3 of the inner winding of the sheet 2 directly thereunder. On both sides of the bump 13, the outer portion 2f of the spirally wound sheet forms a contiguous surface abutting portion 6d abutting the surface 3 of the winding of the sheet adjacent thereto.

The end 5 of the pin 11 adjacent the bump 13 is slightly tapered, although this feature is optional and functionally not necessary for the present invention, but facilitates finding the hole in which the pin is to be inserted. The pin 11 has a diameter at the bump 13 larger than the diameter of the largest recommended hole in which the pin is to be inserted. The diameter of the pin 11 at all other portions, except at the flanged head 12, is smaller than the recommended hole size.

The advantages of such a pin are its ease of insertion and removal without sacrificing the strength or flexibility of the coiled pin after insertion. Such a pin may be readily inserted or removed by hand or by light hammer blows. Since pins are usually loaded in the plane of their diameter rather than along their axis, the low insertion and removal forces are not a disadvantage. Additionally, such a pin in accordance with the present invention does not have the disadvantages of the conventional pins. Furthermore, the flexibility of the coiled pin after insertion is not affected by the insertion into the hole, and as a result, the pin is not prestressed by such insertion. As a consequence, it can absorb greater stresses before reaching the elastic limit.

Referring now again to the drawings, and more particularly to FIGS. 12–16, two applications for the bump lip coiled pin of FIGS. 4 and 5 are illustrated. FIGS. 12 and 13 show storm door closing device connections with the bump lip coiled pin 11 operatively connecting a piston arm 17 to a door closing bracket 16. The bump 13 is larger than a hole 15 is the bracket 16 and is thereby prevented, after insertion, from being removed. The flanged head 12 of the pin 11 prevents the pin from being removed from another hole 15 in the bracket 16. The operating forces on the pin 11 are radial and pependicular to the pin 11, and not axial, and do not tend to exert a longitudinal force which could remove the pin 11 from the holes 15. This pin may be readily inserted by hand or by appropriate tools without danger of being removed during operation of the device. The free diameter of the pin 11 is smaller than the diameter through the holes 15, permitting free pivoting movement of the pin on piston arm 17 relative the bracket 16.

The embodiment of FIGS. 14–15 discloses a headlight assembly with the pin 11 holding the parts together. The pins 11 are inserted through bores in two abutting flanges portions 21 and 22, of a rim and housing, respectively, which hold therebetween a headlight lamp 23. The pin 11 is not free to move longitudinally once inserted, since the bump 13 and the head 12 simultaneously abut clampingly the exposed surfaces of the flanges 21 and 22, respectively. Before mounting, the longitudinal forces on the pin 11 are not strong enough to cause removal of the pin 11 from the flanges 21 and 22, and after mounting a surrounding run prevents removal of the pin 11.

With the pins of the present invention, since flexibility is not lost by insertion, greater flexibility after insertion is achieved with a minimum loss of strength. This means, for example, that thicker material can be used to provide greater strength and yet offer adequate flexibility, which flexibility with prior conventional pins is normally lost upon insertion.

The hole size does not substantially affect the flexibility or strength of the pin designed in accordance with the present invention, contrary to that of the prior pins. The maximum strength can also be achieved by increasing the material or rolling the pin tighter without appreciably affecting the insertion pressure due to the substantially independent flexing lip or bump. Since the bump or spring lip can be placed anywhere along the length of the pin, it can preferably be placed for enough from the end of the pin to enable the pin to be free standing in a hole and/or to allow manual lining up of holes which utilize the pin. The flexible spring lip illustrated in FIGS. 1–3 and 6–11 provides the required flexibility for insertion and retention of the pin in the hole without affecting the resiliency of the coiled windings of the pin, and provides the desired flexibility and/or strength after insertion. Since the folding of the outer portion of the sheet 2 forming the pin adjacent the spring lip up to and against the surface 3 of the winding therebelow can take place not only at the end of each pin, but anywhere along its length, the pin may be designed to be free standing in a hole prior to insertion. Furthermore, partial manual insertion to line up holes in various parts is possible with the present invention, which greatly facilitates assembly. A radial tension force can be limited to any particular part of the pin, and accordingly, hinge applications can be designed utilizing the same holes in all parts of the hinge, which permit larger hole tolerances and the drilling of all parts together for better alignment.

While I have disclosed several embodiments of the present invention, it is to be understood that these embodiments are given by example only and not in a limiting sense.

I claim:
1. A fastening pin, comprising
   a spirally wound sheet material, having an outer end portion on the outer surface thereof terminating in an edge extending along the length thereof.
   said end portion including said edge at least in part spaced from said sheet material wound thereunder by a distance greater than the distance of other adjacent wound portions and constituting a spring lip, and
   said spirally wound sheet material having a diametric thickness through said spring lip greater than the diametric thickness through the rest of said spirally wound sheet material.
2. The fastening pin, as set forth in claim 1, wherein said end portion including said edge abuts said sheet material wound thereunder along part of its length.
3. The fastening pin, as set forth in claim 2, wherein said spring lip extends over a substantial length of said spirally wound sheet material.

4. The fastening pin, as set forth in claim 2, wherein said spring lip is curved.

5. The fastening pin, as set forth in claim 2, wherein said spirally wound sheet material has two ends, and said spring lip is located at one of said two ends.

6. The fastening pin, as set forth in claim 5, wherein said other of said two ends is tapered inwardly.

7. A fastening pin comprising
a spirally wound sheet material, having an outer end portion on the outer surface thereof terminating in an edge extending along the length thereof,
said end portion including said edge at least in part spaced from said sheet material wound thereunder constituting a spring lip,
said spirally wound sheet material having a diametric thickness through said spring lip greater than the diametric thickness through the rest of said spirally wound sheet material,
said end portion including said edge abuts said sheet material wound thereunder along part of its length, and
said spring lip extends over a very small length of said end portion constituting a spring bulge.

8. The fastening pin, as set forth in claim 7, wherein said end portion including said edge abuts said sheet material wound thereunder on both sides of said bulge.

9. The fastening pin, as set forth in claim 7, wherein said spirally wound sheet material has two ends, and one of said ends is formed with a radially outwardly extending flanged portion.

10. A fastening pin comprising
a spirally wound sheet material, having an outer end portion on the outer surface thereof terminating in an edge extending along the length thereof,
said end portion including said edge at least in part spaced from said sheet material wound thereunder constituting a spring lip,
said spirally wound sheet material having a diametric thickness through said spring lip greater than the diametric thickness through the rest of said spirally wound sheet material,
said end portion including said edge abuts said sheet material wound thereunder along part of its length,
said spring lip extends over a substantial length of said spirally wound sheet material, and
said end portion including said edge abuts said sheet material wound thereunder on both sides of said spring lip.

11. The fastening pin, as set forth in claim 10, wherein said spring lip is at the center of said spirally wound sheet material.

12. The fastening pin, as set forth in claim 10, wherein said spirally wound sheet material has two ends, and said spring lip extends substantially up to said two ends.

13. The fastening pin, as set forth in claim 12, wherein at least one of said two ends is tapered inwardly.

14. A fastening pin comprising
a spirally wound sheet material, having an outer end portion on the outer surface thereof terminating in an edge extending along the length thereof,
said end portion including said edge at least in part spaced from said sheet material wound thereunder constituting a spring lip,
said spirally wound sheet material having a diametric thickness through said spring lip greater than the diametric thickness through the rest of said spirally wound sheet material,
said end portion including said edge abuts said sheet material wound thereunder along part of its length, and
said spring lip is planar.

15. The fastening pin, as set forth in claim 14, wherein said spirally wound sheet material has two ends, said spring lip is located at one of said two ends, and said other of said two ends is tapered inwardly.

References Cited

UNITED STATES PATENTS

| 2,737,843 | 3/1956 | Koehl | 85—8.3UX |
| 3,094,344 | 6/1963 | Varga | 85—8.3X |

FOREIGN PATENTS

| 1,355,787 | 2/1964 | France | 24—73.8D |
| 975,504 | 12/1961 | Germany | 85—8.3 |
| 1,013,820 | 12/1965 | Great Britain | 85—8.3 |

DONALD A. GRIFFIN, Primary Examiner

U.S. Cl. X.R.

85—8.3